United States Patent [19]

West, Jr. et al.

[11] Patent Number: 4,544,974
[45] Date of Patent: Oct. 1, 1985

[54] ALUMINA GLASS COMPOSITION AND MAGNETIC HEAD INCORPORATING SAME

[75] Inventors: Bradford D. West, Jr., LaMesa; Jean Berchtold, LaJolla, both of Calif.

[73] Assignee: Eastman Kodak Company, Rochester, N.Y.

[21] Appl. No.: 543,678

[22] Filed: Oct. 20, 1983

[51] Int. Cl.⁴ .................. G11B 5/251; C03C 3/16
[52] U.S. Cl. .................................. 360/120; 29/603; 501/45; 501/47; 501/48; 501/73; 501/77; 501/79
[58] Field of Search .............. 501/45, 47, 48, 73, 501/77, 79; 360/120; 29/603

[56] References Cited

U.S. PATENT DOCUMENTS

| | | |
|---|---|---|
| 2,937,100 | 5/1960 | Oldfield et al. |
| 3,145,453 | 9/1964 | Duinker et al. |
| 3,220,815 | 11/1965 | McMillan et al. ................ 501/15 |
| 3,458,926 | 10/1965 | Maissel et al. |
| 3,770,403 | 11/1973 | Maries et al. .................... 651/43 |
| 4,170,032 | 10/1979 | Yokoyama et al. ............. 360/120 |
| 4,202,700 | 5/1980 | Wilder ........................... 106/39.6 |
| 4,312,951 | 1/1982 | Eppler ............................ 501/24 |
| 4,316,228 | 2/1982 | Fujiwara et al. ............... 360/120 |
| 4,361,860 | 11/1982 | Nozawa ......................... 360/120 |
| 4,391,915 | 7/1983 | Menden-Piesslinger et al. .... 501/48 |
| 4,392,167 | 7/1983 | Joorman ........................ 360/120 |
| 4,455,384 | 6/1984 | Day et al. ...................... 501/48 |

FOREIGN PATENT DOCUMENTS

| | | |
|---|---|---|
| 0000811 | 1/1977 | Japan ............................. 501/79 |
| 56-37246 | 4/1981 | Japan . |
| 382587 | 5/1973 | U.S.S.R. . |
| 420581 | 3/1974 | U.S.S.R. . |
| 461072 | 2/1975 | U.S.S.R. . |
| 463640 | 3/1975 | U.S.S.R. . |
| 579243 | 11/1977 | U.S.S.R. . |
| 688455 | 9/1979 | U.S.S.R. . |

OTHER PUBLICATIONS

Fedrowitz et al., IBM Technical Disclosure Bulletin, vol. 9, No. 11, Apr. 1967, p. 1475.
Hoogendoorn et al., IBM Technical Disclosure Bulletin, vol. 11, No. 9, Feb. 1969, p. 1179.
*Physicochemical Properties of Aluminophosphate Glass*, by Syritskaya.
Yamada et al., "Thermal Properties of New Metaphosphate Glasses", 41, *RCA Review*, pp. 120–126, (1980).
Klein et al., "Glass Formation and Properties in the Aluminum Borophosphate System", 57, *Ceramic Bulletin*, pp. 199–215, (1978).
*J. of Non-Crystalline Solids*, 38 & 39, pp. 879–884.

Primary Examiner—Andrew H. Metz
Assistant Examiner—Terryence Chapman
Attorney, Agent, or Firm—Bernard D. Wiese

[57] ABSTRACT

There are described a glass composition and a magnetic head containing the same, wherein the glass composition comprises an oxide of an alkali metal or alkaline earth, and at least one non-alkali metal oxide in an amount sufficient to provide a coefficient of thermal expansion of $80$–$170 \times 10^{-7}$ °C.$^{-1}$, the composition featuring from 5–15 mole % $Al_2O_3$ and an amount of a compatible glass former sufficient to insure the $Al_2O_3$ is soluble in the composition.

11 Claims, 3 Drawing Figures

ALUMINA GLASS COMPOSITION AND MAGNETIC HEAD INCORPORATING SAME

FIELD OF THE INVENTION

This invention relates to a glass composition used for bonding metals or metal oxides, and more particularly, for glasses used in the manufacture of magnetic recording and reading heads.

BACKGROUND OF THE INVENTION

A variety of products comprise glass bonded to metal or metal oxides in a composite structure. A particularly useful example is a magnetic recording and reading head. Such a head comprises, as is conventional, a ferromagnetic core structure containing a gap at the recording and reading site that is accurately joined by glass bonded to the cores. Such cores either comprise solid ferrite or they are ferrite provided with special plates forming the gapping structure. The plates are a composite of metal alloy wafers laminated with alternating layers of a bonding composition, usually epoxy polymers, the composite being shaped and attached as tips to the cores of the head. In the past, it has not been possible to bond such metal alloy structure with glass in a reliable manner. Glasses would have advantages over polymer adhesives, if they could be used. Such advantages include much higher mechanical modulus and a greater degree of thermal stability and hydrophobicity, which improve the dimensional stability of the metal heads.

Several problems have been encountered in the making of bonded metal or metal oxide and glass products. One problem has been to provide a glass that has a coefficient of thermal expansion that substantially matches that of the metal alloy or metal oxide. Failure to match the coefficient creates thermal stress under varying temperature conditions and eventual cracking of the glass.

Another problem has been that certain glass ingredients are highly volatile, and create bubbles as the glass solidifies. Such bubbles in a magnetic head degrade the integrity of the head structure. If located at the tape contacting surface of the head, they may provide a sharp edge that causes damage to the magnetic tape.

Still another problem has been that certain ingredients useful in glass formulations to match the thermal expansion coefficients of the metal alloy or metal oxide, also render the glass susceptible to chemical attack such as by caustic solutions. Because magnetic heads require a cleaning step using a caustic solution after machining, susceptibility to chemical attack by such caustics cannot be tolerated. It has been suggested that significant amounts of $Al_2O_3$, i.e., at least 5 mole %, will provide the resistance to attack from caustic solutions. The difficulty has been that such amounts of $Al_2O_3$ do not readily dissolve into many useful glass networks.

U.S. Pat. No. 3,458,926 describes one approach to the problem wherein the glass comprises up to 5.7 mole % $Al_2O_3$. In order to solubilize this amount of $Al_2O_3$, excessive $SiO_2$ has to be used as the glass former, namely 52.9 mole %. Such a large amount of $SiO_2$ is disadvantageous because it imparts a coefficient of thermal expansion that is too low ($70.4 \times 10^{-7}$°C.$^{-1}$) to provide a matching coefficient of thermal expansion. To compensate for the mismatch, only an extremely thin layer of glass such as $0.5\mu$ can be used. This in turn requires that the glass be applied by R.F. sputtering techniques, a very limited method of application.

Finally, many glass compositions suffer the disadvantage of having a high softening temperature, that is, a temperature greater than 500° C. Such glasses require special, expensive fixtures to bond them to the metal oxide or metal alloy. The glass discussed above in connection with U.S. Pat. No. 3,458,926 is such a glass.

Thus, there has been a need, prior to this invention, for a glass composition that solves all of the aforesaid problems—that is, has a coefficient of thermal expansion that substantially matches that of the metal alloy or metal oxide to which it is to be bonded, and is resistant to attack by caustic solutions. Most preferably, it also softens at a temperature no greater than 500° C. Glass compositions solving some of these problems are described in, e.g., Japanese Application Kokai No. 81/37246; Russian Pat. No. 382,587; and U.S. Pat. Nos. 3,220,815 and 4,312,951. However, these particular compositions do not solve all these problems. For example, they lack the resistance to caustic solutions that is obtained when at least 5 mole % $Al_2O_3$ is included.

SUMMARY OF THE INVENTION

We have discovered that greater than 5 mole % of aluminum oxide can be made to go into solution in glass while maintaining the advantageous properties of the glass described above. More specifically, a glass former is provided for the large amounts of aluminum oxide needed for resistance to caustics, such glass former being compatible with the need to maintain a coefficient of thermal expansion that matches the metal alloy or metal oxide to which the glass is bonded.

Specifically, in accord with one aspect of the invention, there is provided a glass composition suitable for bonding to metal alloys or metal oxides, the composition comprising an oxide of an alkali metal or alkaline earth, and a non-alkali metal oxide in an amount sufficient to provide a coefficient of thermal expansion to the composition that is from about 80° to about $170 \times 10^{-7}$°C.$^{-1}$. This composition is improved in that (a) from about 5 to about 15 mole % of the composition comprises, in addition to the aforementioned non-alkali metal oxide, an oxide of aluminum, and (b) a sufficient amount of a compatible glass former is included to render the oxide of aluminum soluble in the glass composition.

In accord with another aspect of the invention, a magnetic head is provided comprising the aforedescribed glass composition bonded to a magnetic metal oxide or metal alloy.

Thus, this invention advantageously features a glass composition for bonding to a metal oxide or alloy, and magnetic heads made therefrom, the glass composition having a coefficient of thermal expansion that substantially matches that of the metal alloy or metal oxide as well as resistance to caustic solutions.

An optional advantageous feature of such a glass composition and magnetic heads is that, by being substantially free of volatile components such as lead oxide and fluorine, the glass is free of bubble defects such as could prevent formation of a smooth contact surface at the tape-head interface of the magnetic head.

Yet another optional advantageous feature of such a glass composition and magnetic heads comprising such compositions is that the glass has a softening temperature no greater than 500° C.

Other advantageous features will become apparent upon reference to the following "Description of the Preferred Embodiments", when read in light of the attached drawings.

DESCRIPTION OF THE PREFERRED EMBODIMENTS

Figure 1:
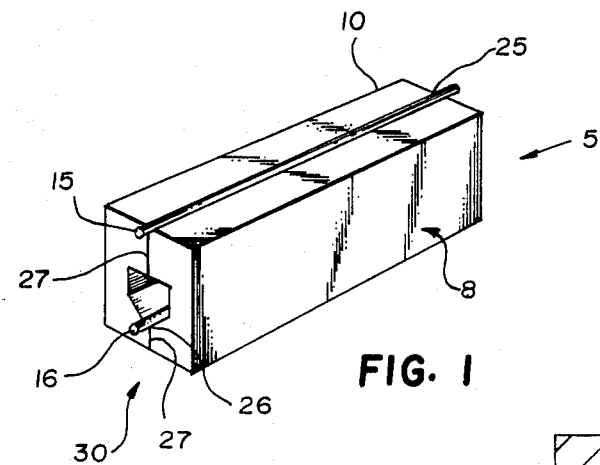
FIG. 1 is an perspective view of a magnetic head in an intermediate stage of manufacture, illustrating one use of the glass composition of this invention.

We have discovered a glass composition comprising the properties needed to solve the aforementioned problems. That is, it has the needed resistance to caustics and coefficients of thermal expansion which substantially match that of the metal alloy or metal oxide to which the glass is to be bonded. Optionally, it also has freedom from volatiles that cause bubbling and a softening temperature no greater than 500° C.

In the preferred embodiments hereinafter detailed, the glass is described as being adapted for bonding to metal alloys or oxides particularly useful in manufacturing magnetic heads. In addition, the glass composition of this invention is useful to bond to such metal alloys or oxides in the making of any end product. Also in the preferred embodiments hereinafter described, $P_2O_5$ is the material most preferably used as the glass former for the large amount of aluminum oxide used to provide caustics resistance. Useful forms of the glass composition of this invention include those in which the glass former is any other material capable of rendering soluble the amount of aluminum oxide of the composition. Other useful examples of such glass formers include vanadium oxide, antimony oxide and germanium oxide. Materials such as $SiO_2$, however, impart too low a coefficient of thermal expansion and are not considered to be useful as the glass former for the $Al_2O_3$.

Two kinds of magnetic materials are usually featured in the manufacture of magnetic heads. These are (a) magnetic ceramics, called ferrite, and (b) metal alloys. In either case, the heads are commonly formed by first forming two core elements which are joined together in such a way as to leave a magnetic gap. Glass is bonded to the joined cores at the gap, and the assembly is further machined as explained in detail, for example, in U.S. Pat. No. 3,557,266. It is this material for which the composition of this invention is particularly useful.

If the cores are formed exclusively from ferrite, a preferred procedure is to hot-press ferrite powder into a bulk shape followed by machining the elements to the exact shape. Particularly preferred ferrite compositions are described in U.S. Pat. No. 3,989,794, and have coefficients of thermal expansion that range from about 80° to about $120 \times 10^{-7}$°C.$^{-1}$.

If the head features metal alloys, preferably the procedure is to form the alloy into thin wafers which, when stacked and bonded together, comprise two laminate plates each attached to one of two core forms. The glass composition of this invention is then used as the bonding composition for the wafers, as well as the glass that is used to maintain the magnetic gap between the two laminate plates. Particularly preferred metal alloy compositions are described in U.S. Pat. No. 3,999,216, col. 9, as having a composition which is, by weight, from 6–12% Si, from 4 to 9% Al, and the remainder being essentially Fe, the alloy being further characterized by a resistivity of at least 100 micro-ohm-centimeters, a porosity of less than 1%, and a Vicker's hardness of greater than 600. Such an alloy has a coefficient of thermal expansion within the range of from about 120° to about $170 \times 10^{-7}$°C.$^{-1}$.

In accordance with one aspect of the invention, there is provided a glass composition that has a coefficient of thermal expansion falling within the two ranges noted above for the preferred metal oxides and metal alloys. That is, the glass has such a coefficient within the range of about 80° to about $170 \times 10^{-7}$°C.$^{-1}$. The exact value is selected to be consistent with the material to which it is to be bonded.

In the glass of the invention, an oxide of an alkali metal or alkaline earth is included, along with a sufficient amount of any metal oxide that will provide the desired coefficient of thermal expansion. In the preferred embodiments, such metal oxides comprise an oxide of zinc, copper or boron. Optionally, an oxide of silicon is included.

An oxide of aluminum is included, in amounts that are between about 5 and about 15 mole % of the composition, through the use of a compatible glass former. This provides sufficient resistance to caustic solutions. A test has been devised to establish whether a glass has sufficient resistance to caustics. The test comprises placing a weighed amount of a piece of the glass having a known surface area, into an aqueous 0.02N solution of a sodium salt having a pH of about 10, for 6 hours at about 80° C. The glass is removed, rinsed, and re-weighed. If the weight loss is no greater than about 0.7 mg per square centimeter of exposed surface area, it is sufficiently resistant as to adequately withstand the caustic solutions commonly used to clean the core elements of the magnetic head.

It has been found that $P_2O_5$ is an excellent compatible glass former for the large amounts of the oxide of aluminum described above. As used herein, a glass former is "compatible" when its use produces a coefficient of thermal expansion that falls within the noted ranges. Most preferably, the mole amount of $P_2O_5$ is at least twice that of the mole percent of the oxide of aluminum.

In a preferred form of the invention, substantially all amounts of volatiles that would cause bubbling in the glass, are excluded. Most preferably, no PbO or F is included, as these are particularly volatile, even in amounts less than 1 mole %.

The preferred composition of the glass of this invention is as follows, in mole %: alkali metal or alkaline earth

| | |
|---|---|
| oxide | 10–40% |
| $Al_2O_3$ | 5–15% |
| ZnO or CuO | 0–25% |
| $B_2O_3$ | 0–25% |
| $SiO_2$ | 0–30% |
| $P_2O_5$ | 10–35%, provided that at least one of ZnO, CuO, $B_2O_3$ or $SiO_2$ is present in an amount that provides the desired coefficient of thermal expansion. |

As is apparent, the composition is substantially free of PbO and of F.

Such a composition, in addition to being caustic-resistant and characterized by a range of coefficients of thermal expansion of from about 80° to about $170 \times 10^{-7} °C.^{-1}$, also is free of lead oxide and fluorine as such compounds would cause bubbling, and softens at a temperature no greater than about 500° C.

Not listed in the above table, but useful nonetheless, are minor amounts of addenda such as pigments or coloring material, so long as they do not adversely affect the coefficient of thermal expansion or the resistance to caustics beyond the values noted above. Preferably, they are also selected so as to not affect the glass softening temperature or cause bubble formation such as occurs with PbO.

Variations within the above-noted ranges of concentration are useful, depending, for example, upon the magnetic material to which the glass is to bond, and the glass flow or melt temperature that is desired. Thus, if the magnetic material is ferrite, the alkali metal oxide is most preferably 10-30 mole % $Na_2O$, to insure that the coefficient of thermal expansion is from about 80° to about $120 \times 10^{-7} °C.^{-1}$. For this range of coefficients, preferably two metal oxides are present from the group ZnO, CuO and $B_2O_3$. On the other hand, if the magnetic material is a metal alloy as specified above, then the alkali metal oxide is most Preferably 10-35 mole % $K_2O$, so as to provide such a coefficient of from about 120° to about $180 \times 10^{-7} °C.^{-1}$. Within each of these ranges (80 to 120 or 120 to 180), the coefficient can be further reduced by additional amounts of one or more of the following: ZnO, CuO, $SiO_2$ or $B_2O_3$. In either case, an amount of from up to 4 mole % $Li_2O$ is useful to reduce thermal expansion and to increase chemical durability.

The alkaline earth oxides that are alternatives for the alkali metal oxides include, BaO, CeO and CaO.

The mole % of $SiO_2$, if used at all, is dependent upon the flow temperature that is desired for the glass. The lower the mole %, the lower the flow temperature.

Similarly, whether CuO or ZnO is used depends upon the melt temperature and viscosity that is desired —CuO provides a lower melt temperature than does ZnO.

Highly preferred are those compositions of the glass that are within the ranges of Table I:

TABLE I

| | Most Preferred Glass Compositions (Mole %) | |
|---|---|---|
| Oxide | For Use With Ferrite | For Use With Ferromagnetic Alloys |
| $Na_2O$ | 10-30 | — |
| $K_2O$ | — | 10-35 |
| $Li_2O$ | 0-4 | 0-4 |
| $Al_2O_3$ | 5-15 | 5-15 |
| ZnO or CuO | 10-25 | 5-15 |
| $B_2O_3$ | 10-25 | 5-15 |
| $SiO_2$ | 0-30 | 0-30 |
| $P_2O_5$ | 10-30 | 10-30 |

Within the foregoing, the most preferred are the compositions in which the $P_2O_5$ is roughly equal, in mole %, to the mole % of alkali metal oxides or alkaline earth oxides. "Roughly equal" in this context means, no more than about 4 mole % difference.

The above formulations for the glass composition have been found to produce a loss of only 0.001 to 0.2 mg/cm², when tested for caustic resistance for 6 hours at 80° C., in a 1:9 mixture of (a) water and (b) a solution containing sodium chromate, monoethylamine, and about 8% sodium dodecylbenzenesulfonate ((b) being available under the trademark "Turco Cavaclean #2" from Turco, a division of Purex), thus demonstrating superior resistance to such caustic detergent solutions. Those compositions featuring the maximum amount of $Al_2O_3$, i.e., from 10 to 15 mole %, had the highest resistance.

The softening temperatures of all the abovedescribed glass formulations are lower than 500° C. The majority of them are between about 350° and about 450° C.

The compositions cited above are obtained by adjusting the raw ingredients selected for the glass in a conventional manner. The proportions of the raw materials may have to be further adjusted for losses and gains during founding, as is known in the art.

Such raw ingredients are blended and melted together in a conventional manner to produce a glass frit. The frit is then either remelted and applied while molten, or is ground into a fine powder for application to the bonding surface. In the latter case, the frit and bonding surface are heated to the flow temperature of the glass, to bond the glass to the bonding surface.

More specifically, in FIG. 1, a magnetic head 5 comprises two core elements 8 and 10 prepared from ferrite as described above. Glass rods 15 and 16 formed from the composition described above are placed at V-grooves 25 and 26 formed at the plane 27 defined by the facing surfaces of the two cores. The combination is heated to the flow temperature of the glass, which melts and bonds to the facing surfaces at plane 27. Upon cooling, the glass hardens to join the cores together and to maintain the gap at portion 30, which becomes the portion that generates the magnetic field used in recording, e.g., magnetic tape. As is conventional, the result is further machined and cleaned with a caustic solution to form the completed magnetic head for a magnetic recorder and reader.

If the cores 8 and 10 are of ferrite, they are prepared by hot-pressing and machining, the appropriate formulation of Table I being selected for the glass.

Figure 2:
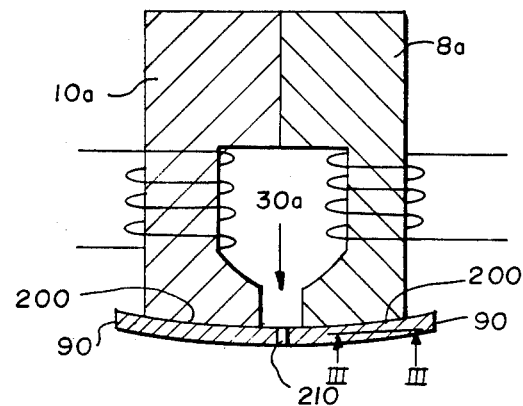
FIG. 2 is a section view of an alternative embodiment of a magnetic head of the invention.
Figure 3:
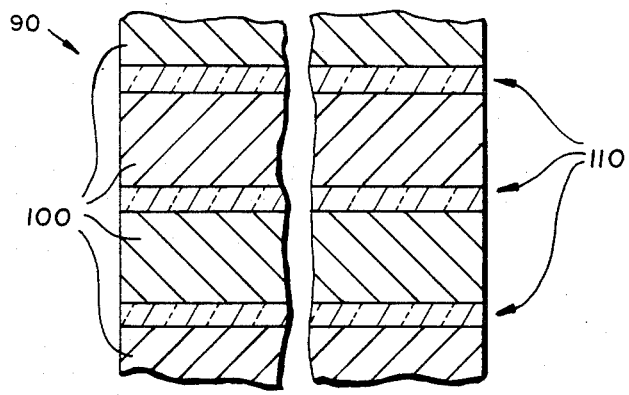
FIG. 3 is a section view taken along the plane of line III—III of FIG. 2, the spacings between parts having been exaggerated for clarity.

Alternatively, ferromagnetic alloys are used to form the magnetic head, as shown in FIGS. 2 and 3. (Parts similar to those described in the previous embodiment bear the same reference numeral to which the distinguishing suffix "a" has been appended.) Specifically, core forms 8a and 10a are of ferrite, as described in the embodiment of FIG. 1. Portion 30a is modified in that two metal alloy laminates 90 are sealed by a glass composition of this invention, to the cores at 200 and to each other at 210. Gap 210 is the recording and/or read gap, and most preferably the glass at this gap comprises one of the compositions of Table I designed for use with ferromagnetic alloys.

Each laminate 90 comprises a plurality of wafers 100, FIG. 3, all roughly having the same two-dimensional shape. The wafers are bonded together by glass 110, such glass comprising a glass composition of Table I that is designed for use with the ferromagnetic alloys. Machining and cleaning proceeds as with the previously described embodiment.

EXAMPLES

The following examples further illustrate the scope of the invention.

EXAMPLE 1

Glass For Use With Magnetic Ferrite

The raw materials of Table II below were blended and melted together to form the glass composition of Table III. This was then ground up, remelted and drawn into a fiber which was placed at a ferrite surface as in FIG. 1, to which it bonded successfully.

TABLE II

| Raw Material | Wt. % |
| --- | --- |
| $Li_3PO_4$ | 0.4 |
| $Na_2CO_3$ | 23.0 |
| $Al_2O_3.3P_2O_5$ | 31.7 |
| ZnO | 12.9 |
| $B_2O_3$ | 13.7 |
| $2Al_2O_3.Si_2O_7.2H_2O$ | 16.6 |
| $Al_2O_3.P_2O_5$ | 1.8 |

TABLE III

| Glass Composition | |
| --- | --- |
| Constituent | Mole % |
| $P_2O_5$ | 18.5 |
| $Al_2O_3$ | 10 |
| $Na_2O$ | 21 |
| ZnO | 15.5 |
| $SiO_2$ | 15 |
| $B_2O_3$ | 19 |
| $Li_2O$ | 1 |

The coefficient of thermal expansion was found to be $125 \times 10^{-7} °C.^{-1}$. This compared to a coefficient of $128 \times 10^{-7} °C.^{-1}$ for the ferrite. The % weight loss when subjected to the caustic resistance test described above was <0.01 mg/cm$^2$.

EXAMPLE 2

Glass For Use With Ferromagnetic Alloy

The raw materials of Table IV were measured out, blended and melted together to give the glass frit composition of Table V.

TABLE IV

| Raw Material | Wt. % |
| --- | --- |
| $K_2O_3$ | 15.8 |
| $KH_3PO_4$ | 34.1 |
| $Al_2O_3.3P_2O_5$ | 20.1 |
| ZnO | 5.6 |
| $B_2O_3$ | 4.9 |
| $2Al_2.Si_2O_7.2H_2O$ | 19.5 |

TABLE V

| Glass Composition | |
| --- | --- |
| Constituent | Mole % |
| $P_2O_5$ | 27.5 |
| $Al_2O_3$ | 9.0 |
| $K_2O$ | 27.5 |
| ZnO | 8.0 |
| $SiO_2$ | 20.0 |
| $B_2O_3$ | 8.0 |

This had a coefficient of thermal expansion of $157 \times 10^{-7} °C.^{-1}$, compared to the coefficient of $154 \times 10^{-7} °C.^{-}$ for the alloy. The % weight loss when subjected to the caustic resistance test described above was <0.01 mg/cm$^2$.

The frit was then crushed and ball milled to yield a fine powder that was dispersed in an organic solvent/binder system comprising 15 g nitrocellulose, 40 ml butyl acetate, 50 ml toluene, 10 ml butanol, and 5 ml acetone. This dispersion was then applied to magnetic alloy wafers using conventional coating techniques. The dispersion was allowed to dry and the binder was burned out at an elevated temperature (375° C.). Firing the glass powder and metal alloy wafers at 875° C. melted the glass, allowing it to flow and coat the metal with a continuous glass enamel. These glass coated metal wafers were then stacked and reheated to fuse the glass layers together giving the desired glass-metal-glass-metal etc., sandwich. Preformed glass wafers of the same composition were placed on the top and bottom of the sandwich and fused to form a monolithic structure.

The monolithic structure was then machined to the proper dimensions for use in forming the tip plates of a magnetic recording head.

EXAMPLE 3

Alternate Use of the Glass of Example 2

The glass composition of Example 2 was melted and fined to remove all bubbles and then cast into a steel mold to form a sputtering target. This target was used in a sputtering system to form a thin continuous glass coating on the magnetic alloy wafers of Example 2. The wafers of glass coated metal were then stacked, heated and fused together to form a glass-metal sandwich. Preformed glass wafers of the same composition were placed on top and bottom of the sandwich and fused to form a monolithic structure.

EXAMPLE 4

Glass Composition Containing Essentially No $SiO_2$

The raw materials of Table VI were measured out, blended, and melted together to give the glass frit composition of Table VII:

TABLE VI

| Raw Materials | Wt. % |
| --- | --- |
| $Na_2CO_3$ | 25.67 |
| $Al_2O_3.3P_2O_5$ | 32.50 |
| CuO | 15.67 |
| $B_2O_3$ | 17.15 |
| $Al_2O_3.P_2O_5$ | 9.01 |

TABLE VII

| Glass Composition | |
| --- | --- |
| Constituent | Mole % |
| $Na_2O$ | 22.5 |
| $Al_2O_3$ | 10.0 |
| CuO | 20.0 |
| $B_2O_3$ | 25.0 |
| $P_2O_5$ | 22.5 |

This had a coefficient of thermal expansion of $120 \times 10^{-7} °C.^{-1}$ and a % weight loss in the caustic resistance test that was <0.001 mg/cm$^2$.

The glass frit was then remelted and applied to a ferromagnetic surface, to which it bonded successfully.

The invention has been described in detail with particular reference to preferred embodiments thereof, but it will be understood that variations and modifications can be effected within the spirit and scope of the invention.

What is claimed is:

1. In a glass composition suitable for bonding to metal alloys or metal oxides, the composition comprising an oxide of an alkali metal or alkaline earth, and at least one metal oxide of a non-alkali metal in an amount sufficient to provide a coefficient of thermal expansion to said composition that is from about 80° to about $170 \times 10^{-7} °C.^{-1}$;

the improvement wherein
(a) from about 5 to about 15 mole % of said composition comprises an oxide of aluminum; and
(b) said composition further includes about 10 to about 35 mole % of a compatible glass former for said oxide of aluminum to render said oxide of aluminum soluble in said composition.

2. In a glass composition suitable for bonding to metal alloys or metal oxides, the composition comprising oxides of phosphorus, zinc or copper or boron, aluminum, an alkali metal or alkaline earth, and having a coefficient of thermal expansion that is from about 80° to about $170 \times 10^{-7} °C.^{-1}$;

the improvement wherein
(a) said oxide of aluminum comprises from about 5 to about 15 mole % of said composition,
(b) about 10 to about 35 mole % of oxide of phosphorus is present as a glass former so that said oxide of aluminum is soluble in said composition, and
(c) said composition contains substantially zero mole % of volatiles that cause bubbling.

3. In a glass composition suitable for fusing to metal alloys or metal oxides, the composition having a coefficient of thermal expansion that is from about 80° to about $170 \times 10^{-7} °C.^{-1}$;

the improvement wherein said composition comprises as mole percentages of said composition,
10–40% alkali metal or alkaline earth oxide,
5–15% oxide of aluminum,
0–25% oxide of zinc or copper,
0–25% oxide of boron,
0–30% oxide of silicon, and
10–35% oxide of phosphorus,
provided that an oxide of at least one of said boron, zinc, copper, and silicon is present in an amount sufficient to provide to the composition said coefficient of thermal expansion.

4. A glass composition as defined in claim 1, 2 or 3, having a softening temperature no greater than about 500° C.

5. In a magnetic head for a magnetic recorder and reader, the head comprising magnetic metal or metal oxide bonded to a glass composition comprising oxides of an alkali metal or alkaline earth, and at least one metal oxide of a non-alkali metal in an amount sufficient to provide a coefficient of thermal expansion to said composition that is from about 80° to about $170 \times 10^{-7} °C.^{-1}$;

the improvement wherein
(a) from about 5 to about 15 mole % of said composition comprises an oxide of aluminum;
(b) said composition further includes about 10 to about 35 mole % of a compatible glass former for said oxide of aluminum to render said oxide of aluminum soluble in said composition; and
(c) said composition contains substantially zero mole % of volatiles that cause bubbling.

6. In a magnetic head for a magnetic recorder and reader, the head comprising magnetic metal or metal oxide bonded to a glass composition comprising oxides of phosphorus, zinc or copper, boron, aluminum, an alkali metal or alkaline earth; said composition having a coefficient of thermal expansion that is from about 80° to about $170 \times 10^{-7} °C.^{-1}$;

the improvement wherein
(a) said oxide of aluminum comprises from about 5 to about 15 mole % of said composition,
(b) about 10 to about 35 mole % of oxide of phosphorus is present so that said oxide of aluminum is soluble in said composition, and
(c) said composition contains substantially zero mole % of lead oxide and of fluorine.

7. In a magnetic head for a magnetic recorder and reader, the head comprising ferromagnetic metal alloy wafers laminated together with a bonding composition, the improvement wherein said bonding composition comprises, as mole percentages of said composition,
10–35% oxide of potassium,
5–15% oxide of aluminum,
5–15% oxide of zinc or copper,
5–15% oxide of boron,
0–30% oxide of silicon, and
10–30% oxide of phosphorus,
said composition being further characterized by a coefficient of thermal expansion that is from about 120° to about $170 \times 10^{-7} °C.^{-1}$, and containing substantially zero mole % of each of lead oxide and fluorine.

8. In a magnetic head for a magnetic recorder and reader, the head comprising magnetic metal oxide bonded to a glass composition;
the improvement wherein said bonding composition comprises, as mole percentages of said composition,
10–30% oxide of sodium,
5–15% oxide of aluminum,
10–25% oxide of zinc or copper,
10–25% oxide of boron,
0–30% oxide of silicon and
10–30% oxide of phosphorus,
said composition being further characterized by a coefficient of thermal expansion that is from about 80° to about $120 \times 10^{-7} °C.^{-1}$, and containing substantially zero mole % of each of lead oxide and fluorine.

9. A magnetic head as claimed in claim 6, 7 or 8, wherein said composition has a softening temperature no greater than about 500° C.

10. A magnetic head as claimed in claim 5, wherein said glass former is an oxide of phosphorus, vanadium, antimony or germanium.

11. A magnetic head as claimed in claim 10, wherein the metal oxide of a non-alkali metal is an oxide of zinc, copper or boron.

* * * * *